US006952472B2

(12) United States Patent
Zhang et al.

(10) Patent No.: US 6,952,472 B2
(45) Date of Patent: Oct. 4, 2005

(54) DYNAMICALLY ESTIMATING ECHO RETURN LOSS IN A COMMUNICATION LINK

(75) Inventors: Yimin Zhang, Germantown, MD (US); Bogdan Kosanovic, Bethesda, MD (US)

(73) Assignee: Texas Instruments Incorporated, Dallas, TX (US)

( * ) Notice: Subject to any disclaimer, the term of this patent is extended or adjusted under 35 U.S.C. 154(b) by 530 days.

(21) Appl. No.: 10/029,669

(22) Filed: Dec. 31, 2001

(65) Prior Publication Data

US 2003/0123399 A1 Jul. 3, 2003

(51) Int. Cl.[7] .............................................. H04M 9/08
(52) U.S. Cl. ........................... 379/406.01; 379/406.02; 379/406.04; 379/406.05; 379/406.06; 379/406.08; 379/406.09; 379/406.12
(58) Field of Search ........................ 379/406.01–406.16

(56) References Cited

U.S. PATENT DOCUMENTS

| 4,349,707 | A | | 9/1982 | Perrigault et al. | |
|---|---|---|---|---|---|
| 5,577,097 | A | * | 11/1996 | Meek | 379/406.04 |
| 5,978,763 | A | * | 11/1999 | Bridges | 379/406.04 |
| 6,683,960 | B1 | * | 1/2004 | Fujii et al. | 381/71.8 |
| 2002/0041678 | A1 | * | 4/2002 | Basburg-Ertem et al. | |
| 2002/0131583 | A1 | * | 9/2002 | Lu | |

FOREIGN PATENT DOCUMENTS

EP      0963057 A2 *  8/1999  ............ H04B/3/46

EP      0 963 057 A2   12/1999

OTHER PUBLICATIONS

"Nonintrusive Measurements of the Telephone Channel," IEEE Transactions on Communications, IEEE Inc. New York, US, vol. 47, No. 1, Jan. 1999, pp. 158–167, XP000802438; ISSN: 0090–6778; (Gaensler T. et al).

* cited by examiner

*Primary Examiner*—Sinh Tran
*Assistant Examiner*—Ramnandan Singh
(74) *Attorney, Agent, or Firm*—Abdul Zindani; Wade James Brady, III; Frederick J. Telecky, Jr.

(57) ABSTRACT

A method of estimating an echo return loss of a communication link measures the peak power value of a signal received from a far end of a communication link and the corresponding peak power value of a signal received from the near end of the communication link. When the near end signal is free from near end voice and excessive noise, the near end corresponding peak will be the echo of the far end power. The far end power is monitored and when a peak is detected, a period, which can be equal to a filter length period, is initiated. When the period has run, the delay line attached to the near end is polled to determine the peak power in the delay line. This peak power will correspond to the far end peak. If a peak, exceeding the first peak is detected before the period has run, the period is reinitiated. The echo return loss estimate is calculated as a ratio of the far-end peak power value to the near-end peak power value. The measured far-end signal is the payload information that the communication link was established to convey and the measured near-end signal is the echo of the payload.

20 Claims, 3 Drawing Sheets

DYNAMICALLY ESTIMATING ECHO RETURN LOSS IN A COMMUNICATION LINK

FIELD OF THE INVENTION

The invention relates to a method of measuring the signal quality of a telephony link. Specifically, the method measures the echo return loss (ERL) as a ratio of the peak power of far-end speech to the near-end peak power of the echo created by the far-end speech.

BACKGROUND OF THE INVENTION

FIG. 1 illustrates a prior art equipment configuration used to measure the echo return loss for one terminal of a communication link. The communication link has a near-end terminal 8 comprising a telephone 2, a four-to-two wire hybrid circuit 3, and an echo canceller circuit 4. The far-end terminal is similarly configured but, for simplicity, is represented by telephone 5, alone. During a conversation between the near-end and far-end users, the far end signal, which contains both the far-end user's speech and incidental background noise, enters the near-end terminal 8 as signal X at node 9.

The far-end signal is provided to the four-to-two wire hybrid circuit 3 and then to near-end telephone 2. Due to the unavoidable non-linearities present in the hybrid circuit 3, some portion of the far-end signal power is coupled onto the output 7 of the hybrid circuit 3 as an echo. A composite signal Y exists at node 7 containing the echo signal and the combined speech of the near-end user and any incidental background noise from the near-end user's environment. A filter having a filter length period selected and designed to be longer than the hybrid dispersion time is used prior to power level measurements at 7 to allow the echo canceller 4 to operate properly.

Echo canceller 4 synthesizes the expected value of the echo signal and subtracts this value from the composite signal Y existing at node 7. The resulting difference signal, existing at node 14, is intended to contain only the near-end signal originating from telephone 2. Ultimately, difference signal, e, is provided to the far-end telephone 5.

Prior art methods of measuring the echo return loss rely on disconnecting the far-end telephone 5 from the near-end terminal 8 and connecting a test signal generator 6 in a manner illustrated as switch 10 of FIG. 1. Test signal generator 6 injects a conditioned and reproducible test signal into the near-end terminal 8 at node 9, where the signal power from the far-end terminal would normally exist. This test signal may be synthesized pseudo-noise, pseudo-white noise, or tones of a constant power level.

A measurement of the test signal power, X, at node 9 is made. Additionally, the power level of the composite signal Y, comprised of the coupled echo signal and any signal generated by the near-end telephone 2, is measured at node 7. The test is made when little to no signal is being generated at near end telephone 2. Assuming the signal power of any signal generated by the near-end telephone is very small in comparison to the coupled echo signal power, the ratio of the measured test signal power X to the measured power level Y provides an estimate of the echo return loss for the near-end terminal 8.

The shortcoming of the prior art method is that the echo return loss may not be measured dynamically during the course of a telephone conversation. Rather, the echo return loss may only be measured by disconnecting the far-end terminal from the near-end terminal 8 and injecting a conditioned and reproducible test signal into the near-end terminal 8.

SUMMARY OF THE INVENTION

The present invention overcomes the deficiencies of the prior art method by providing a method to measure the echo return loss dynamically during the course of a telephone conversation or some other form of telephony communication. No specialized test equipment need be externally connected to the communication link and no disruption of the communication link is necessary. Moreover, the present invention uses less time to measure the echo return loss and makes it possible to monitor the variation of the echo return loss over the course of the communication.

A method of estimating the echo return loss of a communication link is disclosed, having the steps of: measuring a peak power value of a signal received from a far end of a communication link, within a period; measuring a peak power value of a signal received from a near end of the communication link, within a near-end delay line coordinated with the period; and calculating the echo return loss estimate, for the period, as a ratio of the far-end peak power value to the near-end peak power value. The measured far-end signal is the payload information that the communication link was established to convey and the measured near-end signal has coupled echo signal power from the far-end signal. In the exemplary embodiment, the power measurement period is described with reference to a filter length period because the exemplary embodiment has a delay corresponding in length to encompass the filter length period. However, it is not necessary to use the filter length period, as any defined period will do to allow for periodic updating of the ERL estimate so long as a corresponding period for the echo measurement is available.

The method estimates ERL every time a far-end peak power is detected. The present invention can use any peak detection method. The estimated value is passed to a higher level state machine where the estimates are processed to establish a refined running estimate of the ERL.

Each estimation event begins by looking for peak far-end power. The first peak power value $P_X$ and the time index of the peak $t_p$ are recorded and a filter length period is initiated. A near end power delay line is used for clean power measurement with near end noise subtracted. The length of the delay line can be slightly longer than the filter length to ensure that the entire near end signal corresponding to the far end peak filter length is stored. If higher power is measured within the filter length period after the first peak power measurement, $P_X$ and $t_p$ will be updated to reflect the power and time information of the higher measurement and the filter length period will be restarted. If no higher power is detected, the first ERL estimate will be calculated after the end of the filter period $t_e$ based upon the measured peak $P_X$ and its echo $E_X$. Once the filter period is complete, the power of the far end signal is measured until the next peak is detected.

After the peak power of the far-end signal has been measured, the maximum power level of the echo peak $E_X$ corresponding to the measured far-end signal peak is measured. The echo return loss for the $i^{th}$ filter length period may be estimated by the equation:

$$erl_i = 10*\log_{10}(P_{Xi}) - 10*\log_{10}(E_{Xi}) \qquad (1)$$

where, $erl_i$ is the echo return loss for the $i^{th}$ filter length period, expressed in decibels, and $P_{Xi}$ and $E_{Xi}$ are the measured powers for the far-end signal and corresponding echo signal, respectively, assuming the near-end speech and background noise are negligible.

It may happen that, at the time of the estimate, there is near-end speech or non-stationary noise combined with the echo signal. In this case, the estimated ERL can be much lower than the actual ERL. This effect will be dealt with by the state machine.

The state machine has three states identified as the ERL Stable state, ERL Change Suspected state, and the ERL Change Confirmed state. When a communication link is first established, the state machine is initialized to the ERL Stable state. After the echo return loss is calculated for the $i^{th}$ occurrence of a filter length period, this value is compared with the refined estimate of the echo return loss to determine whether a state change and an update to the refined estimate of the ERL are appropriate.

An update to the refined estimate of the echo return loss is made, while in the ERL Stable state or the ERL Change Confirmed state, according to the equations expressed by:

$$erl'_j = (1-a1)*erl'_{j-1} + a1*erl_i, \text{ if } erl'_{j-1} \leq erl_i; \text{ and} \quad (2)$$

$$erl'_j = (1-a2)*erl'_{j-1} + a2*erl_i, \text{ if } erl'_{j-1} > erl_i, \quad (3)$$

where, $0 \leq a2 \leq a1 \leq 1$;

a1 has a value close to one;

a2 has a value close to zero;

$erl_i$ is the measured echo return loss estimate for the current filter length period;

$erl_{j-1}$ is the refined echo return loss estimate for the previous refined estimate updating period; and $erl'_j$ is the refined echo return loss estimate for the current refined estimate updating period.

BRIEF DESCRIPTION OF THE DRAWINGS

Preferred embodiments of the invention are discussed hereinafter in reference to the drawings, in which.

DETAILED DESCRIPTION OF THE INVENTION

Figure 1:
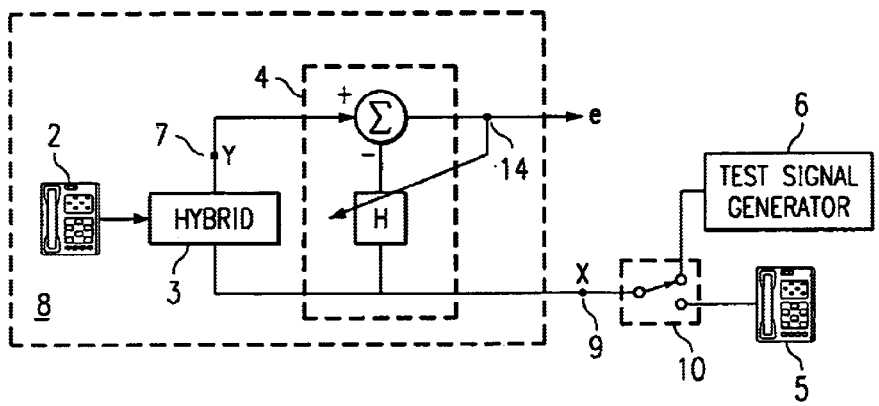
FIG. 1—illustrates a prior art equipment configuration used to measure the echo return loss for one terminal of a communication link.
Figure 2:
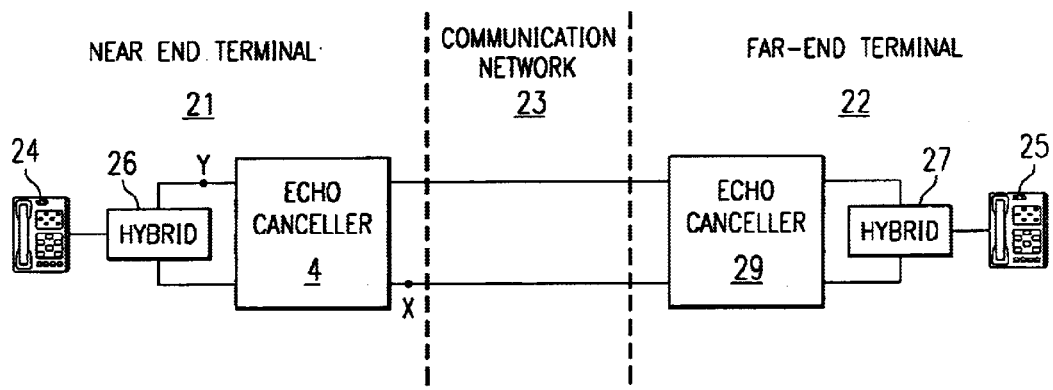
FIG. 2—illustrates a representative communication link between two telephones.

FIG. 2 illustrates a representative communication link 20 between two telephones 24, 25. The link is comprised of a near-end terminal 21, a far-end terminal 22, and a communication network 23 that interconnects the near-end and far-end terminals 21, 22. The near-end terminal 21 has a user telephone 24, a hybrid circuit 26, and an echo canceller circuit 28. Similarly, the far-end terminal 22 has a user telephone 25, a hybrid circuit 27, and an echo canceller circuit 29. Far-end signal power, X, is received by the near-end terminal at node 30. Node 31 receives the coupled echo signal from the far-end signal as well as the near-end signal produced by telephone 24. This near-end signal contains both the speech of the near-end telephone user and the background noise of the user's environment. Together, the near-end signal and far-end echo signal are represented by Y.

Figure 3:
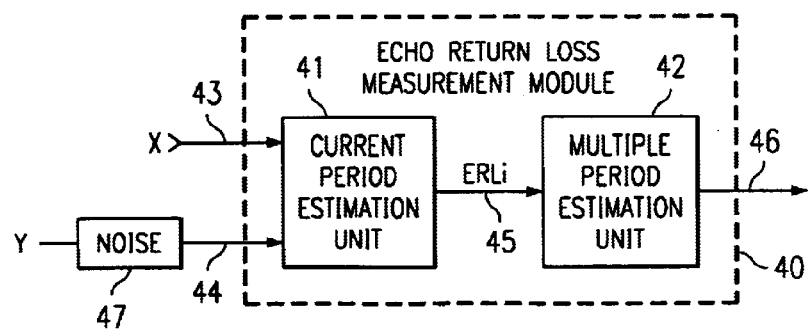
FIG. 3—illustrates an echo return loss measurement module having a current period estimation unit and a multiple period estimation unit.

FIG. 3 illustrates an echo return loss measurement module 40 having a current period estimation unit 41 and a multiple period estimation unit 42. Current period estimation unit 41 measures the far-end power X, presented on line 43, and the combined far-end echo signal and near-end signal Y presented on line 44. A noise cancellation circuit 47 estimates the near-end noise within the near-end signal Y, then synthesizes the estimated near end noise and subtracts the synthesized near-end noise from the near-end signal Y to eliminate as much of the noise as possible.

Figure 4:
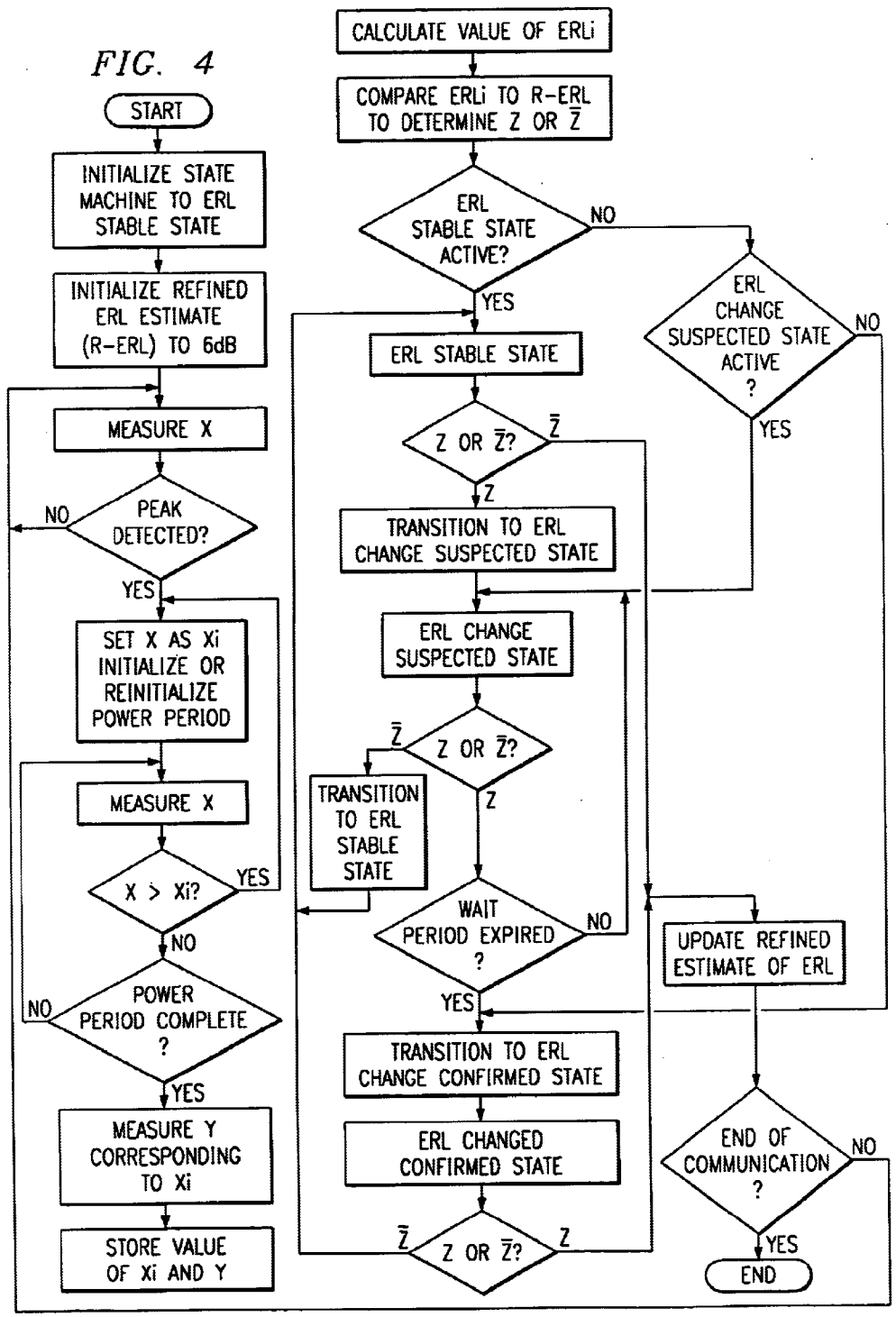
FIG. 4—illustrates a high-level flowchart of the invention.

Referring now to FIG. 4, the state machine and an ERL estimate are initialized. The value of signal X is measured. Whenever a peak power $P_X$ is detected in the measured far-end power X above a noise threshold, the current period estimation unit 41 will record this value as $X_i$ and will initiate the running of a filter length period. During the running of this period, the current period estimation unit 41 continuously measures the far-end power X. If the new measured current value of X is greater than $X_i$, a new peak has occurred within the filter period. $X_i$ is reset to this new value and the filter period is restarted. Once there are no values of X detected greater than $X_i$ and the filter period has completed, the value of Y corresponding to $X_i$ is measured. The value of Y corresponding to $X_i$ is the maximum of peak value of Y taken from the delay line once the filter period has ended and is designated $Y_i$. Because the delay line contains a running storage of Y, and is only slightly longer than the filter period, the maximum value in the delay line will correspond to the maximum value of X during the filter period. The values of $X_i$ and $Y_i$ are stored for comparison to determine an ERL estimate.

A noise threshold, for example a −35 dBm0 threshold can be used to distinguish the presence of far-end payload information such as speech from far-end noise, since most instances of the communicated payload information will have far more power than this threshold. While background noise from the far end will generally be below this threshold. ERL can not be reliably estimated based on echo from background noise.

Figure 5:
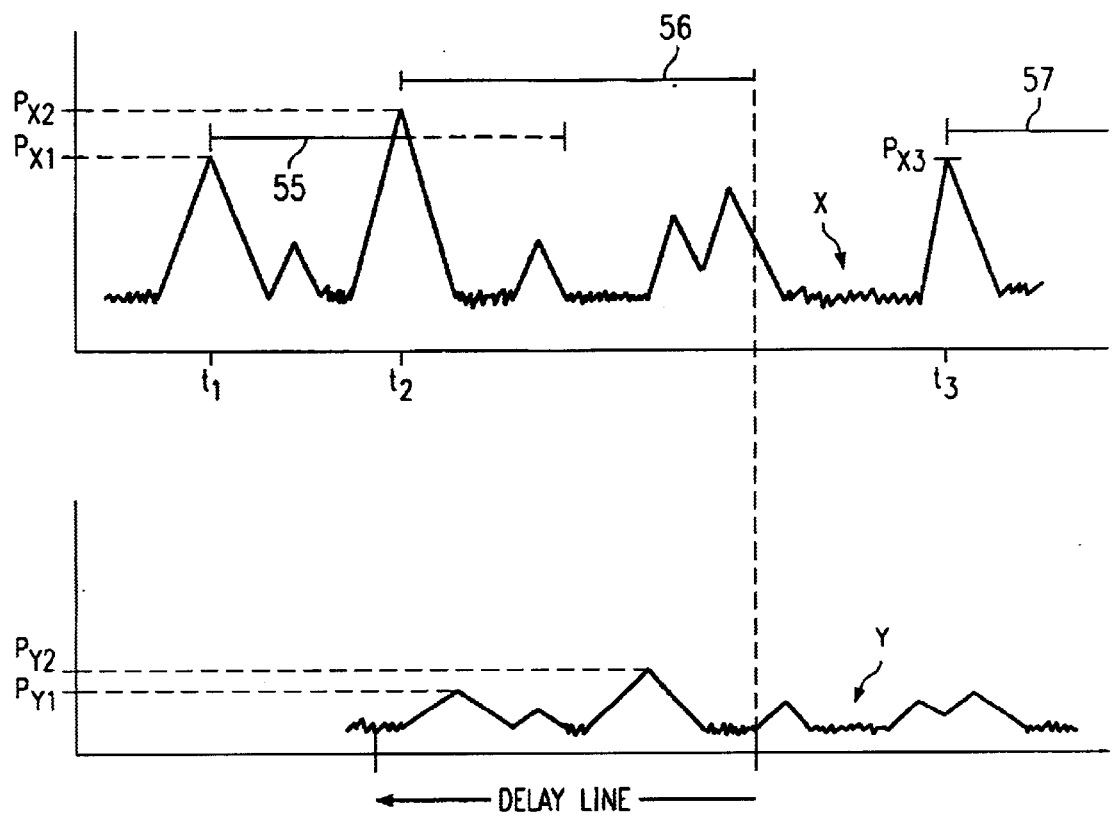
FIG. 5—illustrates the time-varying power of an exemplary far-end signal of FIG. 2 measured by the current period estimation unit of FIG. 3.

FIG. 5 illustrates the time-varying power of an exemplary far-end signal X measured by the current period estimation unit 41. FIG. 5 also illustrates the corresponding echo signal Y. At time $t_1$, the first peak $P_1$ in the far-end signal power X is detected. Time $t_1$ therefore marks the beginning of the first filter length period 55. Values of the far-end signal power X are measured at times during the filter length period. When the power X at peak $P_2$ exceeds the power at peak $P_1$, before the completion of filter period 55, the filter length time 56 is restarted at $t_2$. Once a full filter length period 56 has run, the maximum values of X during the filter length period 56 and Y during the corresponding delay line period 58 are collected and compared to determine an ERL estimate. The power measurement at time $P_{X2}$ provides the value of the maximum power measured within the bounds of the first full filter length period 56, and the value $PY_2$ is the maximum power of the echo. These power measurements are used to calculate the echo return loss for this period. At some later indefinite time after the termination of the first filter length period, the far-end signal power X again peaks $P_{X3}$ at time $t_3$ and a third filter length period 57 begins. In this instance, the peak power measurement $P_{X2}$ within the third filter period 57 occurs at time $t_3$. The corresponding echo maximum $P_{y3}$ is measured during delay line period 59 and the two values are used to determine ERL.

As stated previously, the filter length periods occur at indefinite times. In other words, the periods do not occur periodically. The initiation of a filter length period occurs when a peak is detected in the far-end power signal X. This period may run its full length in which case a new ERL estimate may be established. The period may instead be interrupted by detection of a greater peak thus restarting a new filter length period.

Once the peak power value for the far-end signal X has been identified and measured, the current period estimation unit 41 attempts to identify the corresponding echo power peak, on signal line 44, that corresponds to the far-end signal peak. FIG. 5 illustrates the echo signal Y corresponding to the far-end signal X. Due to the delay, the echo signal Y may be offset in time from the far-end signal X. Assuming that the hybrid circuit 26 is linear and the near-end background noise and speech power are negligible, the echo signal peak $P_y$ will correspond proportionately to the far-end signal peak $P_x$ that created it. As illustrated, the echo peaks correspond to the far-end signal peaks. The power values of the echo peaks $P_y$ are less than but have profiles corresponding to the signal peaks $P_x$.

Within the bounds of the $i^{th}$ filter length period, the maximum measured power, $P_{Xi}$, of the far-end signal occurs at time time $t_i$ and the maximum measured echo signal power, $P_{Yi}$, occurs at time $t_i+\tau$. Current period estimation unit 41 determines the echo return loss estimate from these two peak-power measurements using the equation expressed by:

$$erl_i = 10*\log_{10}(P_{Xi}) - 10*\log_{10}(P_{Yi}) \quad (1)$$

where, $erl_i$ is the echo return loss for the $i^{th}$ filter length period, expressed in decibels, and $P_{Xi}$ and $P_{Yi}$ have the same resolution, preferably 5 ms root mean square-based power.

After each echo return loss value is calculated, the current period estimation unit 41 provides the value to the multiple period estimation unit 42 on line 45, as illustrated in FIG. 3. This latter estimation unit 42 makes a determination of whether to update a refined estimate, $erl'_j$, of the echo return loss using the value of $erl_i$ for the most recent filter length period (hereinafter referred to as the current period). This determination is based upon the current state of the multiple period estimation unit 42 state machine.

Figure 6:
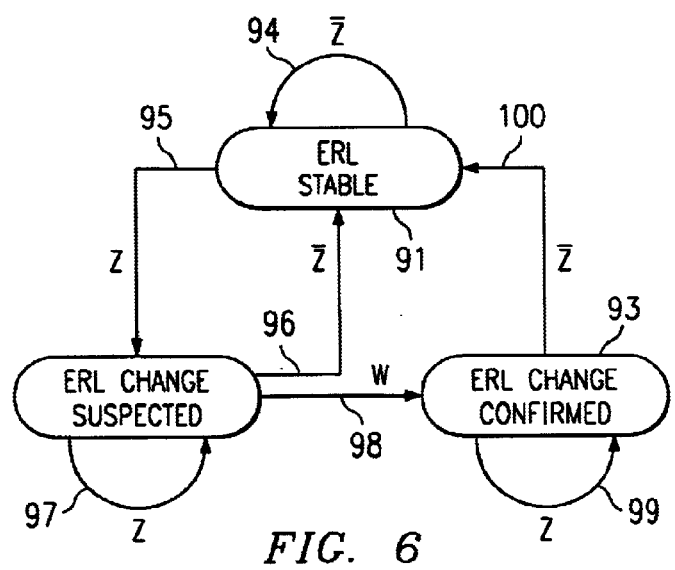
FIG. 6—illustrates a state machine of the multiple period estimation unit of FIG. 3.

FIG. 6 illustrates the multiple period estimation unit 42 state machine 90. This state machine 90 has three states 91–93 identified as the:

1) ERL Stable state 91;
2) ERL Change Suspected state 92; and
3) ERL Change Confirmed state 93.

When a communication link is first established, the state machine is initialized to the ERL Stable state 91. After the echo return loss is calculated for the $i^{th}$ occurrence of a filter length period, this value is compared with the refined estimate of the echo return loss to determine whether a state change is appropriate. Only three conditions are used to determine whether a state change will take place. These conditions may be expressed by the following:

Condition Z exists when: $erl_i < erl'_j - 9$ dB;

Condition $\overline{Z}$ exists when: $erl_i \geq erl'_j - 9$ dB; and

Condition W exists when: both ERL Change Suspected state 92 is active and a wait period has expired without an intervening state change, where, $erl_i$ is the estimated echo return loss value for the current filter length period, as calculated by equation (1);

$erl'_j$ is the refined echo return loss for the current refined estimate updating period;

filter length period i does not necessarily have the same value as updating period j; and condition W takes precedence over condition Z.

The value of $erl'_j$ is also initialized at the onset of the communication link and is preferably set to a value of 6 dB, since the International Telecommunication Union ITU-T Recommendation G.168, Digital Network Echo Cancellers (hereby incorporated into the specification by reference), requires a minimum echo return loss of 6 dB. As each echo return loss value is calculated for the current period, the multiple period estimation unit 42 determines which of the state conditions exists. Assuming that ERL Stable state 91 is active, no state change will take place if condition $\overline{Z}$ exists but a transition to ERL Change Suspected state 92 will occur if condition Z exists. While in the ERL Change Suspected state 92, a transition to ERL Stable state 91 will occur if condition $\overline{Z}$ exists, a transition to ERL Change Confirmed state 93 will occur if condition W exists, and no state change will occur if condition Z exists. When the ERL Change Confirmed state 93 is active, a transition to ERL Stable state 91 will occur when condition $\overline{Z}$ exists and no state change will occur when condition Z exists.

An update to the value of the refined estimate, $erl'_j$, of the echo return loss is made only when either the ERL Stable state 91 or the ERL Change Confirmed state 93 is active. The updated value becomes the refined estimate of the echo return loss for the current updating period. An active ERL Change Suspected state 92 indicates that the echo return loss measured for the current filter length period is substantially less than the value expected. This deviation can occur for several reasons. For example, suppose an echo peak corresponding to the maximum far-end signal peak occurs in the same filter length period that near-end speech or high-power background noise is provided to echo return loss measurement module 40. The power measured on line 44, $P_{Yi}$, will contain the power contributions of both the echo peak of interest and the near-end speech or high-power background noise. In this case, the value of $P_{Yi}$ will far exceed the expected power value of the echo peak of interest. Referring back to equation (1), it may be observed that as the value of $P_{Yi}$ becomes increasingly greater with respect to $P_{Xi}$, the value of $erl_i$ becomes increasingly smaller.

Therefore, when near-end speech or high-power background noise occurs at the same time as the echo signal of interest, the utility of the echo return loss measurement for the current period is discounted. It is discounted by refraining from updating the refined estimate of the echo return loss when this situation is suspected. A transition to the ERL Change Suspected state 92 occurs when the particular conditions exist that characterize this situation. Once the transition occurs, a wait timer is activated. This timer runs for a particular period of time referred to as the wait period. If a subsequent measurement of the echo return loss, occurring within the wait period, has a value conforming to the constraint of condition Z, then the echo return loss deviation is deemed to be short term and likely caused by double-talk or near-end high-power background noise. Double-talk occurs when the far-end user and near-end user speak at the same time.

A deviation between the measured echo return loss for the current period and the value expected may also occur due to real changes of the echo return loss. Such real changes are generally more long term in their effect. Base upon experimental results, a wait period of about 750 ms provides a good indication of whether the deviation of the measured echo return loss is a short-term or long-term effect. During the running of the wait timer, no updates are made to the refined estimate of the echo return loss. If a transition from ERL Change Suspected state 92 to ERL Stable state 91 occurs, the deviation was a short-term one and the current value of the refined echo return loss estimate still provides an accurate gauge of the actual echo return loss. Upon returning to ERL Stable state 91, the wait timer is disabled. A subsequent return to the ERL Change Suspected state 92 initializes and runs the wait timer again.

If the 750 ms wait period expires without an intervening transition to the ERL Stable state 91, a transition from ERL Change Suspected state 92 to ERL Change Confirmed state 93 occurs. In this case, the deviation of the current estimate from the refined estimate of the echo return loss indicates that the refined echo return loss estimate may no longer provide an accurate measure of the actual echo return loss. Once the ERL Change Confirmed state 93 becomes active, it remains active for the period that the current echo return loss estimate remains substantially less (e.g., 9 dB less) than the refined estimate of the echo return loss. During this period, the refined estimate is updated after each measurement of the echo return loss and converges toward the expected value of the echo return loss. A return to the ERL Stable state 91 occurs when the measured echo return loss is equal to or greater than the refined estimate less 9 dB. The ERL Change Confirmed state 93 provides a necessary safe harbor to re-converge the refined echo return loss estimate whenever a substantial decrease in the measured echo return loss occurs for a relatively long period. No such re-convergence is possible in the ERL Stable state 91, under these same conditions, and no update to the refined estimate of the echo return loss occurs at all in the ERL Change Suspected state 92.

An update to the refined estimate of the echo return loss is made, while in the ERL Stable state 91 or the ERL Change Confirmed state 93, according to the equations expressed by:

$$erl'_j = (1-a1)*erl'_{j-1} + a1*erl_i, \text{ if } erl'_{j-1} \leq erl_i; \text{ and} \quad (2)$$

$$erl'_j = (1-a2)*erl'_{j-1} + a2*erl_i, \text{ if } erl'_{j-1} > erl_i, \quad (3)$$

where,
$0 \leq a2 \leq a1 \leq 1$;
a1 has a value close to one;
a2 has a value close to zero;
$erl_i$ is the measured echo return loss estimate for the current filter length period;
$erl'_{j-1}$ is the refined echo return loss estimate for the previous refined estimate updating period; and
$erl'_j$ is the refined echo return loss estimate for the current refined estimate updating period.

Also, when the most recent measurement of the estimated echo return loss creates a condition necessitating a state transition, the state transition is executed prior to determining whether to update the refined estimate of the echo return loss.

By examining equations (2) and (3), above, it may be observed that the refined estimate of the echo return loss may rapidly increase in value but decreases in value slowly. The equations are specifically designed this way to better converge the refined estimate of the echo return loss toward the actual value of the echo return loss. When there is negligible near-end speech or background noise to combine with the echo signal, the measured power of $P_{Yi}$ more accurately reflects the power of the echo signal alone. This is because the speech or noise power does not significantly change the measured power when additively combined with the power of the echo signal. When the near-end speech or noise power is relatively significant with respect to the echo signal, the combined signal power includes the additive contributions of both signals and the measured power is greater than the actual power of the echo signal. This condition would produce an inaccurate under estimate of echo return loss. Though it is possible that the near-end speech or background noise could negatively combine with the echo signal to reduce the combined power of the signals, this situation is very unlikely.

Referring now to equation (1), for values of $P_{Yi}$ that are relatively small with respect to $P_{Xi}$, the estimated value of the echo return loss for the current period will be greater than it would be for relatively large values of $P_{Yi}$. Therefore, occasionally higher values of the measured estimate of the echo return loss are more likely to reflect the actual value of the echo return loss than occasionally lower values of the measured estimate. To take advantage of this feature, the refined estimate of the echo return loss is converged quickly toward the current estimate of the echo return loss when the current estimate equals or exceeds the refined estimate. Conversely, the refined estimate is slowly converged toward the current estimate when the current estimate of the echo return loss is less than the refined estimate.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method of estimating an echo return loss of a communication link, comprising:
    measuring a peak power value of a signal received from a far end of a communication link within a power period, said power period being initiated by detection of a peak in said far-end signal power;
    measuring a peak power value of a signal received from a near end of said communication link, within an echo period corresponding to said power period; and
    calculating said echo return loss estimate, for said power period, as a ratio of said far-end peak power value to said near-end peak power value, wherein
        said far-end signal comprises payload information that said communication link was established to convey, and
        said near-end signal includes coupled signal power echo from said far-end signal.

2. The method of claim 1, further comprising:
    initiating the start of a first power period when a first peak is detected in said far-end signal power; and
    terminating said first power period when a predetermined period of time has expired since initiating said start of said first period.

3. The method of claim 2, further comprising:
    reinitiating the start of a second period upon the detection of a peak after the termination of said first period.

4. The method of claim 2, further comprising:
initiating the start of a second period upon detection of a peak after the termination of said first period.

5. The method of claim 4, further comprising:
for each one of a plurality of sequential periods, j, calculating a refined estimate of said echo return loss based on estimated echo return loss values for a current power period and a number of prior power periods.

6. The method of claim 5, wherein:
said refined echo return loss estimate is calculated using a formula that allows the refined estimate to increase in value at a greater rate than it decreases in value.

7. The method of claim 6, wherein:
when said echo return loss estimate for said current power period is greater than or equal to said refined echo return loss estimate for one of said number of prior power periods, calculating said refined echo return loss estimate for said current power period comprises the calculation given by:

$$erl_{ref,current}=((1-a1)*erl_{rel,prior})+(a1*erl_j); \text{ and}$$

when said echo return loss for said current power period is less than said refined echo return loss estimate for one of said number of prior power periods, calculating said refined echo return loss estimate for said current power period comprises the calculation given by:

$$erl_{ref,current}=((1-a2)*erl_{rel,prior})+(a2*erl_j), \text{ where}$$

$0 \leq a2 \leq a1 \leq 1$,
$erl_{ref,current}$ is said refined echo return loss for said current power period,
$erl_{rel,prior}$ is said refined echo return loss for one of said prior power periods, and
$erl_j$ is said echo return loss estimate for said current power period.

8. The method of claim 7, further comprising:
initializing the value of said refined echo return loss estimate for a first one of said number of periods to about 6 dB.

9. The method of claim 7, further comprising:
when in a first state machine state, transitioning to a second state machine state when a difference of said refined echo return loss estimate, for one of said number of prior power periods, less a first subtrahend exceeds said echo return loss estimate for said current power period;
when in said second state, transitioning to said first state when said difference is less than or equal to said echo return loss estimate for said current power period;
when in said second state, transitioning to a third state machine state when a wait period has expired, since last entering said second state, without an intervening transition to said first state; and
when in said third state, transitioning to said first state when said difference is less than of equal to said echo return loss estimate for said current power period.

10. The method of claim 9, further comprising:
refraining from calculating said refined echo return loss estimate while said state machine is in said second state.

11. The method of claim 10, further comprising:
refraining from calculating said refined echo return loss estimate when said echo return loss estimate for said current power period is less than or equal to about 6 dB.

12. The method of claim 11, wherein:
said payload information is part of a conversation between a near-end user and a far-end user; and
said echo return loss estimate is dynamically and repeatedly calculated during said conversation.

13. The method of claim 2, wherein:
said first peak must be above a threshold value set to differentiate speech received from said far-end of said communication link form from noise received from said far-end.

14. The method of claim 1, further comprising:
estimating near-end noise within said near-end signal;
synthesizing said estimated near-end noise; and
subtracting said synthesized near-end noise from said near-end signal before measuring said near-end peak power value.

15. The method of claim 1, further comprising:
multiplying a logarithmic value of said far-end peak power value by a predetermined value and ascribing the product to a first decibel value;
multiplying a logarithmic value of said near-end peak power value by a predetermined value and ascribing the product to a second decibel value; and
subtracting said second decibel value from said first decibel value to obtain said echo return loss estimate for said power period.

16. A method of estimating an echo return loss of a communication link, comprising:
measuring a peak power value of a signal received from a far-end of a communication link within a filter length period, said filter length period being initiated by detection of a peak in power of said far-end signal;
measuring a peak power value of a signal received from a near end of a communication link, within said filter length period;
calculating said echo return loss estimate, for said filter length period, as a ratio of sai far-end power value to said near-end peak power value, wherein
said far-end signal includes the speech of a far-end user; and
said near-end signal includes echoed speech from said far-end signal.

17. The method of claim 16, wherein:
said near-end signal also includes the speech of a near-end user and near-end background noise.

18. The method of claim 17, wherein:
said echo return loss estimate is dynamically and repeatedly calculated during a conversation between said near-end and far-end users.

19. The method of claim 16, wherein:
said echo return loss estimate is based on the ratio of said far-end user speech power to said echo power and said estimate is not calculated when said near end power is close to or exceeds said far end user speech power, indicating that said near end power contains more than the far end echo.

20. Apparatus for estimating an echo return loss of a communication link, comprising:
a measuring unit operatively connected to receive signals from the near-end and the far-end of a communication link that measures a peak power value of a signal received from said far-end within a power period, said power period being initiated by detection of a peak in said far-end signal power, measures a peak power value of a signal received from said near-end within an echo period corresponding to said power period; and a comparator for estimation of said echo return loss for said power period as a ratio of said far-end power value to said corresponding near-end peak power value, wherein said far-end signal is comprised of speech of a far-end user; and said near-end signal is comprised of echoed speech from said far-end signal.

* * * * *